E. A. NELSON.

SPRING SUSPENSION FOR MOTOR VEHICLES.

APPLICATION FILED JAN. 26, 1920.

Reissued May 11, 1920.

14,856.

INVENTOR.

Emil A. Nelson

UNITED STATES PATENT OFFICE.

EMIL A. NELSON, OF DETROIT, MICHIGAN, ASSIGNOR TO MARTIN JURIST, OF TOLEDO, OHIO.

SPRING SUSPENSION FOR MOTOR-VEHICLES.

14,856. Specification of Reissued Letters Patent. Reissued May 11, 1920.

Original No. 1,254,928, dated January 29, 1918, Serial No. 877,654, filed December 17, 1914. Application for reissue filed January 26, 1920. Serial No. 354,206.

*To all whom it may concern:*

Be it known that I, EMIL A. NELSON, a citizen of the United States of America, residing at Detroit, in the county of Wayne and State of Michigan, have invented certain new and useful Improvements in Spring Suspensions for Motor-Vehicles, of which the following is a specification, reference being had therein to the accompanying drawings.

This invention relates to a spring suspension particularly designed for motor vehicles, and the primary object of my invention is to provide a simple and inexpensive construction wherein a vehicle body or frame supported or suspended in accordance with this invention will be cushioned against excessive movements in both lateral and vertical directions relative to a chassis.

Another object of this invention is to provide a spring suspension or system embodying springs of the cantaliver type constructed and arranged to prevent the transmission of vibrations to the vehicle frame or body from the axles or running gear thereof and to resist rebound upon heavy flexure of the spring in certain directions as suggested or apparent herefrom.

In attaining the above and other objects apparent from the disclosure hereof, the spring suspensions have been constructed with a view of reducing the cost of manufacture and at the same time of retaining the features whereby road worthiness, safety, simplicity and ease of fabrication are secured. With these and other ends in view, my invention resides in the novel construction to be hereinafter specifically described and then claimed.

Reference will now be had to the drawings, wherein—

Figure 3:
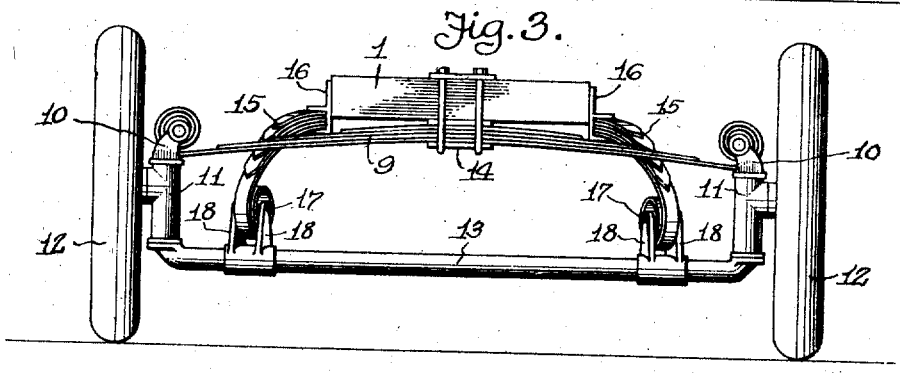

Fig. 3 a front end elevation.

In the drawings the reference numeral 1 denotes a frame or body of any suitable construction having side members as shown and connected to the front end thereof is a cross spring 9 of the semi-elliptic type formed with involute coils or springs at its ends, the innermost convolution of each of which is mounted to turn upon a pin or bearing member secured between parallel ears 10 on the upper ends of steering knuckles 11 carrying the front steering wheels 12. The knuckles 11 are connected in any suitable manner to the non-turning front axle 13 shown and the spring is rigidly secured intermediate its ends to the front end of the frame by a clip 14 or other suitable means.

Figure 1:
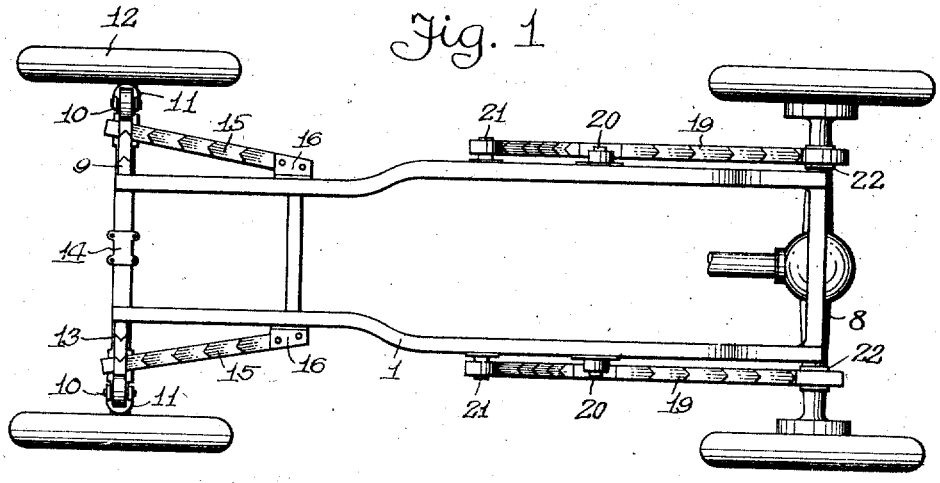
Figure 1 is a plan view of a motor vehicle chassis provided with a spring construction embodying the invention.
Figure 2:
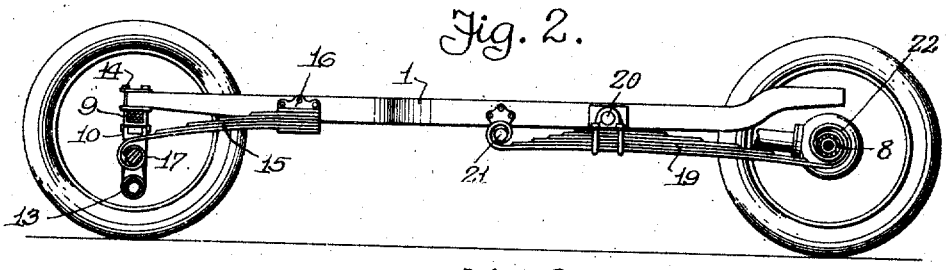
Fig. 2 is a sectional side elevation of the same.

The involute coils at the ends of the spring 9 each comprises a plurality of convolutions closely assembled and capable of distention and retraction, the winding and unwinding of the convolutions retarding various movements of the frame 1 and absorbing the vibrations of the axle, preventing their transmission to the frame or body of the vehicle and also tending to prevent rebound of the springs under extreme flexure. In a like manner lateral movement of the frame 1 in either direction is yieldingly resisted by the involute ends of the spring when said spring is arranged transversely of the frame, as shown in Fig. 3, and when the springs are arranged longitudinally of the frame, as shown in Figs. 1 and 2, end motion of said frame is yieldingly resisted by each convolution. Upon compression of the springs under load, a return movement of the frame is cushioned by the involute ends of the springs and it is also apparent that the ends serve the purpose of the common forms of shock absorbers, and obviate the necessity for spring hangers or links for connecting one or both ends of the springs to their support to permit said springs to straighten out or expand under load.

To hold the front axle in proper transverse relation to the frame, the usual radius or brace rods are dispensed with and spring members 15 substituted therefor, these members each comprising a quarter elliptic or inverted single arm cantaliver leaf spring with a convolute end or coil. The rigid end of each spring 15 is rigidly secured by means of a bracket or yoke 16 to one side of the frame 1 or to any suitable member connected thereto, and extends forwardly therefrom to a point adjacent the front axle where its convolute end is pivotally attached to the axle by means of a pivot pin or bolt 17 passing through suitable bearing ears 18 rigid on the axle and through the sleeve 6 in the eye 5 of the coil. Preferably these springs 15 are each extended forwardly at an angle to the longitudinal side members of the frame to bring the point of attachment of each spring to the axle as near the end or knuckle thereof as practicable to better brace the axle and at the same time permit the wheel to turn with the necessary radius of movement upon the knuckles in steering the vehicle.

By substituting these springs 15 for the radius rods commonly employed to hold the axle, the necessity for universal joints is obviated due to the yield of the springs and their end coils, and said springs also serve to assist in supporting the load. The slight twisting strain which will be put upon these springs when the axle is tilted by the passing of one wheel over an obstruction, is taken by the coils which are free to yield laterally.

In Figs. 1 and 2 the rear end of the frame 1 is shown as supported upon cantaliver springs 19 each comprising a leaf spring body portion having convolute ends, the body being pivotally attached to the frame by means of a stud 20 in the usual manner and the forward convolute end, by means of a stud 21 on the frame. The rear convolute end of each spring is attached to the rear axle casing 8, preferably, by providing a sleeve 22 to turn on the casing and forming the eye of the coil. The convolute ends of the cantaliver spring thus form convenient means for yieldingly and pivotally attaching said ends to the frame and axle.

Obviously the spring embodying the invention may be embodied in other arrangements of spring suspension, the system disclosed having obvious advantages to those skilled in the art, and other changes in the form or construction of said spring may be made without departing from the spirit of the invention. I do not therefore limit myself to the form, construction or arrangement shown.

What I claim is:

1. A new article of manufacture, comprising a cantaliver spring having involute ends, means for pivotally attaching said spring intermediate its ends to a member to be supported thereby, said member being so located as to provide a spring with a long and a short arm, means for connecting the involute end of the short arm of said spring to said member to be supported, and means for connecting the involute end of the long arm of said member to a supporting member.

2. The combination with a vehicle frame and running gear therefor, of a cantaliver spring having involute ends, means on the frame for pivotally connecting the spring intermediate the ends thereof to said frame at a point to provide a long arm at one end of the spring and a short arm at the opposite end, rigid means for attaching the eye of the involute end of the short arm of the spring to said frame, and rigid means for connecting the eye of the involute end of the long arm of the spring to a member of the running gear.

3. For automotive vehicles having a vehicle frame and running gear including a front axle, wheels pivoted thereto, and a rear axle, said vehicle frame having longitudinally spaced side members extending above said axles, a flexible cantaliver spring system for yieldingly distancing and supporting said frame on said front and rear axles, including a pair of cantaliver springs, one located outside each side member and connected to said side member adjacent to the rear thereof, and to the outside thereof, the free ends of said springs being connected to said rear axle and a pair of cantaliver multiple leaf springs connected at their rigid ends to the outside face of said side members adjacent to the front end thereof, extending forwardly at an angle to said side members, the free ends of said last mentioned springs being operatively associated with said front axle near the respective ends thereof.

4. In an automobile in combination, a front axle, a rear axle, a vehicle frame having side members extending over said axles, and a spring construction for supporting and distancing said frame on said axles comprising cantaliver springs for supporting each of said side members on said rear axle and a pair of cantaliver flexible brace rods and supporting springs, extending from said frame to said front axle and located entirely above said front axle, said last mentioned springs connected at their rigid ends to the frame adjacent to the front thereof and located at a horizontal angle thereto, said springs connected at their movable ends to and on top of said front axle at fixed points, adjacent to the respective extremities of said axle.

5. In an automobile, a front axle, a driven rear axle, and a housing therefor, a motor vehicle frame, a spring system between the frame and axles including a pair of cantaliver springs connected at one end to and outside of the frame and rotatably connected to said rear axle housing adjacent the rear wheels, and a pair of flexible brace and supporting springs rigidly connected to said frame and pivotally attached to said front axle, said springs diverging from said frame to said axle adjacent either extremity thereof to provide a broad supporting base therefor and brace said axle.

6. For automotive vehicles having a front axle, wheels pivoted thereto, a rear axle, and a vehicle frame having longitudinally spaced side members extending above said axles, a flexible cantaliver spring system for yieldingly distancing and supporting said frame on said front and rear axles, including a pair of forwardly diverging cantaliver multiple leaf springs connected at their rigid ends to the outside face of said side members adjacent the front end thereof, the movable ends of said springs being operatively associated with said front axle adjacent the respective extremities thereof, and cantaliver springs connected to said side members adjacent the rear ends thereof and on the outside thereof, the movable ends of said last mentioned springs being operatively associated with said rear axle.

7. For automotive vehicles having a vehicle frame and running gear, including a front axle, wheels pivoted thereto, and a rear axle, said vehicle frame having longitudinally extended side members located above said axle, a cantaliver spring system for yieldingly distancing and supporting said frame on said front and rear axles, including a pair of cantaliver multiple leaf springs connecting the rear portion of said frame with said rear axle and a pair of multiple leaf single arm cantaliver springs connected to said side members adjacent the front of said frame on opposite outside faces thereof, said last mentioned springs diverging to said front axle close to the respective ends thereof, each of said last mentioned springs located above said front axle, certain of the leaves thereof pivoted at the free ends of the spring in rigid fixed positions on said axle.

8. In an automobile, a front axle having front wheels pivoted thereto, a driving rear axle and rear wheels, an axle housing, a motor vehicle frame having longitudinal side bar members, a spring system between said frame and axles including a rear pair of cantaliver springs, one connected to each side bar member, outside the frame and rotatively connected on said rear axle housing adjacent to the rear wheel and a front pair of forwardly diverging flexible brace and supporting springs, one rigidly connected to each side bar member on the outside thereof and operatively attached to said front axle adjacent said front wheels to provide a roadworthy spring system substantially as set forth.

9. For automotive vehicles having a non-turning front axle, wheels pivoted thereto, a ar axle and a vehicle frame having longitudinally spaced side members, a flexible cantaliver spring system for yieldingly distancing and supporting said frame from said front and rear axles, including a pair of cantaliver multiple leaf springs connected at their rigid ends to the outside face of said side members and adjacent the front end thereof, the movable ends of said springs being operatively associated with said front axle adjacent each extremity thereof, said pair of springs diverging from said frame to said axle, and cantaliver springs connected to said side bars adjacent the rear ends thereof and on the outside thereof, the movable ends of said last mentioned springs being operatively associated with said rear axle.

10. For automotive vehicles having a non-turning front axle, wheels pivoted thereto, a rear axle and a vehicle frame having side bars extending above and adjacent said axles, a flexible cantaliver spring supporting system between each side bar and said front and rear axles including a pair of cantaliver single arm multiple leaf springs connected at their rigid ends to the side bars of the vehicle frame adjacent the front end thereof, the operative ends of said springs being flexingly connected to said front axle, said springs being located at an angle to the sides of the frame and cantaliver springs connected to said side bars adjacent the rear end thereof and at their operative ends movably connected to the rear axle.

11. In an automotive vehicle having a frame, a non-turning front axle and pivoted front wheels on the outer ends of said axle, a pair of single arm multiple leaf springs located outside said frame rigidly connected at their rigid ends to the sides of the frame adjacent an end thereof and at an angle thereto, said springs connected at their operative ends with the front axle; the pair being located at diverging angles to connect the sides of the frame to the axle adjacent the wheel pivots.

12. In an automotive vehicle, a non-turning front axle, pivoted front wheels, a vehicle frame having side bar members, a bracket yoke attached to each side bar member adjacent the front end thereof and a pair of single arm multiple leaf springs connected at their rigid ends to the side bar members through said bracket yokes and diverging from the frame to the axle, the operative ends of said springs being operatively connected to said axle adjacent the wheel pivots by means fixed to said front axle to give a broad supporting base to said frame and at the same time permit said wheel to turn.

13. In an automotive vehicle having a frame, a non-turni g front axle, and pivoted front wheels, a spring suspension including a pair of single arm multiple leaf springs connected at their rigid ends to brackets carried by the sides of the frame and at their operative ends with the front axle, said springs being located at divergent angles to the longitudinal axis of the vehicle with their ends connected to said axle by fixed pivots near the pivotal point for the wheel to brace the axle as set forth and permit the wheels to turn.

14. In an automobile in combination, a front axle, a rear axle, a vehicle frame having frame members extending above said axles, and a spring construction for yieldingly carrying said frame on said axles and supporting the same against excessive movement, comprising cantaliver springs parallel to the longitudinal axis of the vehicle frame for supporting said frame members to said rear axle and a pair of cantaliver supporting springs and flexible brace rods connected at their rigid ends to the frame adjacent the front end thereof and located at an angle to the longitudinal axis of the vehicle frame, said last mentioned springs being connected at fixed points to said front axle at their movable ends adjacent either extremity of said axle.

15. In a motor vehicle, a front axle, a rear axle, a frame adapted to carry a body and power plant, said axles and frame being arranged and maintained at substantially right angles, and a spring suspension connecting said frame to said axles, including a pair of multiple leaf cantaliver springs of varying leaf length connecting the frame to the rear axle, and a second pair of multiple leaf cantaliver springs of varying leaf lengths, one spring of said latter pair rigidly connected to one side of the frame, and the other to the other side thereof, said springs being located to form horizontal and vertical angles relative to the sides of the frame, said springs diverging outwardly and operatively connected to said front axle adjacent each extremity thereof, certain of the springs being constructed and arranged to allow slight longitudinal movement between the body and axle to which they are secured irrespective of any relative vertical movement between said body and axle.

16. In a motor vehicle, a front axle, a frame adapted to carry a body and power plant, said axle and frame arranged and maintained at substantially right angles and a spring suspension connecting said frame to said axle including a pair of springs, one spring rigidly connected on the outside of the frame on one side of the longitudinal axis and the other spring rigidly connected on the outside of the other side of the frame, on the other side of said axis, said springs being located to form horizontal and vertical angles relative to the axis of the frame, said springs diverging outwardly and located entirely above said axle and operatively connected thereto, adjacent each extremity thereof at fixed points on the upper side of said axle.

17. In an automobile having a front axle, a rear axle, wheels supporting said axles and the vehicle frame, a spring construction for yieldingly supporting and bracing said frame relative to said axles against excessive lateral movement comprising a pair of single-arm multiple leaf cantaliver springs, connected at their rigid ends to the frame and located at opposed angles to each other, diverging from said frame to said front axle, the operative ends of said springs being connected to said axle adjacent said wheels, said connection being fixed laterally relatively to said axle, and a pair of cantaliver springs connected to said frame and at their free ends to said rear axle by means permitting limited longitudinal movement between the axle and frame.

EMIL A. NELSON.